Patented May 11, 1926.

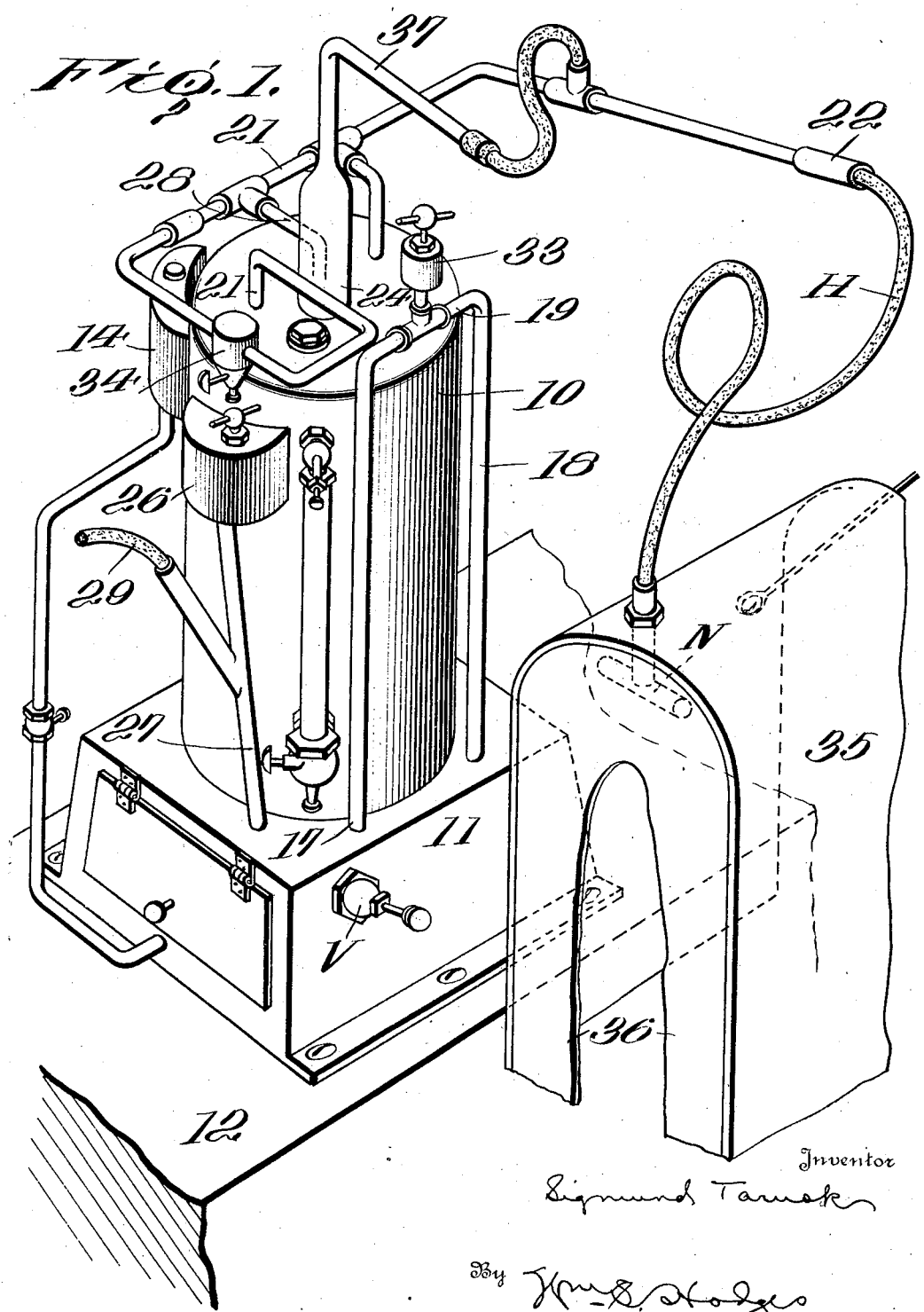

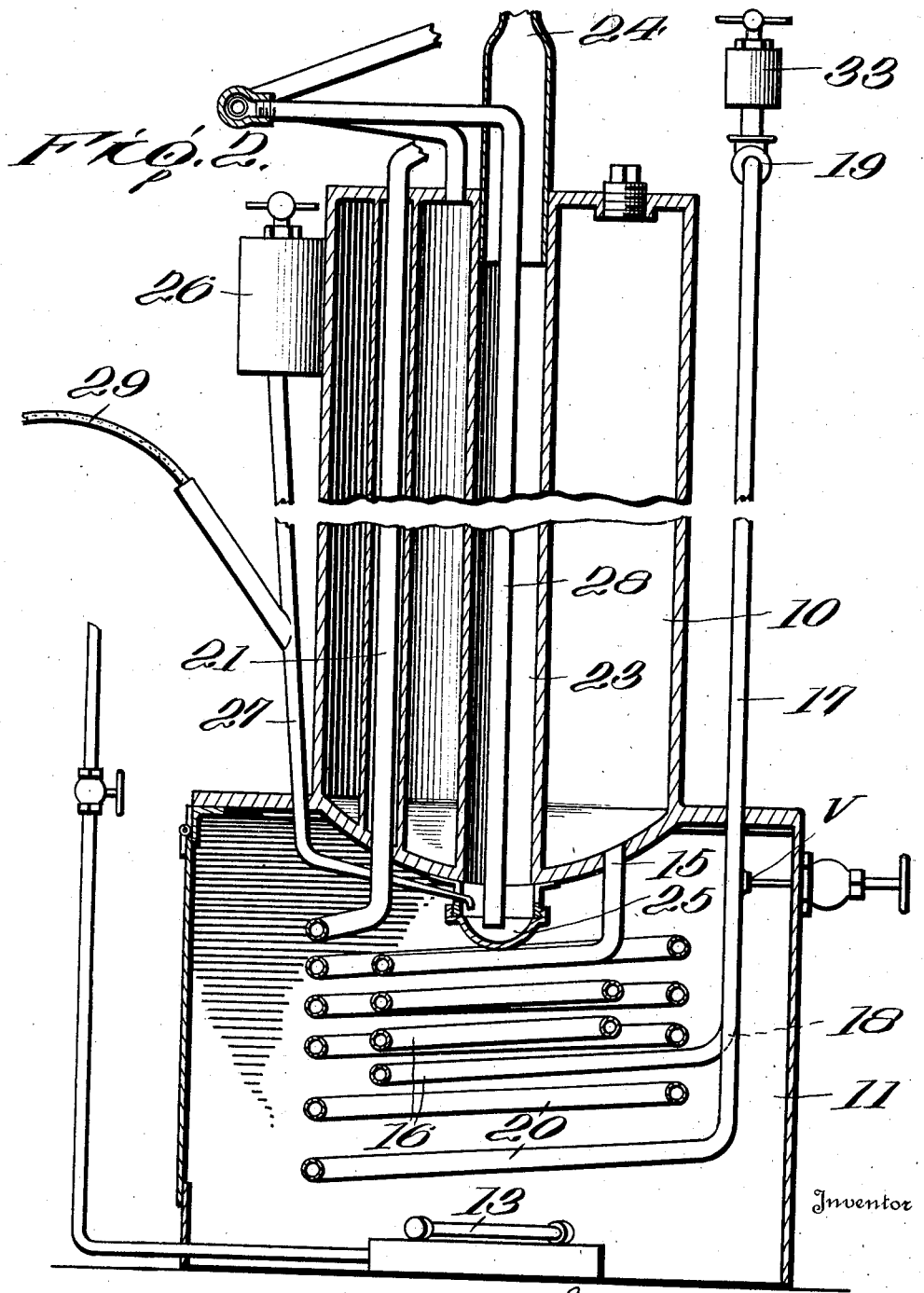

1,584,254

UNITED STATES PATENT OFFICE.

SIGMUND TARNOK, OF NEW ORLEANS, LOUISIANA, ASSIGNOR TO TARNOK, INC., A CORPORATION OF LOUISIANA.

METHOD OF TREATING PLANTS.

Original application filed November 19, 1923, Serial No. 675,775. Patent No. 1,513,138, dated October 28, 1924. Divided and this application filed April 8, 1924. Serial No. 704,948.

This invention pertains to the art of treating trees, plants and other growing vegetation, for the purpose of eliminating those agents of nature which normally tend to destroy them and to also enable them to overcome the destructive effects of such agents.

It is well-known that all living plants obtain their nourishment from the air and soil, through minute cells or pores in their leaves, bark, tissues, and roots. From the air they absorb gaseous substances such as oxygen, hydrogen, and carbonaceous gases. From the earth they absorb water through their roots. For instance, a leaf of cotton has from 4,500 to 5,000 cells per square inch.

It is also well-known that most insects, bugs, weevils, caterpillars and worms are not provided with nasal passages, but breathe through pores or cells in the body. The body of a bug of the boll-weevil type, for example, is provided with from 3,000 to 5,000 of such cells or pores.

Like humans and animals, insects and plants alike strive for nourishment, light, heat and protection. Throughout the span of life plants are constantly subjected to the destructive action of certain agents of nature such as insects, bugs, weevils, borers, caterpillars, worms, fungi and various bacteria, which, if unrestrained, will curtail production by their injurious onslaughts on the plants, buds, blossoms and fruit. A single well-known specific instance is the wide spread yearly damage to cotton crops by the boll weevil.

One of the objects of the invention is to provide a simple method of fumigating trees, plants and other vegetation, with suitable chemicals which will be inhaled into the pores of the insect body, causing instant death, said chemicals being of a character which will not injure the plants being treated. A further object is to employ chemicals which may be absorbed by the plant with safety, and which will serve as a plant food and also act as a resistant inoculation against further onslaughts of the destroying agents. A further object is to destroy insect life by causing a substance to adhere to plants, which substance will not harm the plants, but possesses hydrogen, which in the presence of moisture, such as rain or dew, will combine with the oxygen given off by the plants and emit odors fatal to insect life.

The invention will be hereinafter fully set forth and particularly pointed out in the claims.

In the accompanying drawings:—

Figure 1 is a diagrammatic perspective view illustrating an apparatus constructed in accordance with the invention. Figure 2 is a longitudinal sectional view thereof.

Referring to the drawings, 10 designates a water tank, preferably of cylindrical shape, supported upon a fire box 11, which in turn is carried by a platform 12, mounted on any desired type of conveyance, such for instance as a truck. Located within the fire box 11 is a burner 13, which is fed from a tank 14, attached to the exterior of the water tank. Leading from the bottom of the water tank 10, is a water outlet pipe 15, provided with a coiled portion 16, immediately above the burner 13. A hot water pipe 17 leads from said coil and extends above the water level in the tank 10, being joined with a steam vapor pipe 18, by means of a short pipe section 19. The flow of water is controlled by a valve V. The steam vapor pipe is formed into a coil 20 located above the burner 13, and preferably surrounding the coil 16. Extending upwardly from the coil 20 is a steam discharge pipe 21, leading to a coupling 22, to which a nozzle N may be connected by means of a hose H.

As shown, the tank 10 is provided with a central bore 23, from which extends an escape pipe 24, for the outlet of the hot air and products of combustion from the burner 13. Extending across the bottom of the bore or chamber 23 is a vaporizing cup 25, located in a space surrounded by atmospheric air, in position to be heated by the burner 13, and receiving a constant supply of fumigating material from a tank 26, through the medium of a pipe 27. The smoke or smudge-like fumes generated in the receptacle 25 by heat without combustion, in the presence of atmospheric air, are carried off by a fumes pipe 28, extending longitudinally through the bore 23, and provided with a lateral branch by means of which it may be connected with the steam pipe 21. If desired, compressed air from any suitable source may be introduced into the pipe 27 through the branch pipe 29.

A container 33 is mounted on the cross pipe 19, to introduce an insecticide into the steam pipe, and if desired an additional chemical container 34 may be placed in communication with the steam pipe 21.

Secured to the base 12 in any desired manner, is a hood 35 positioned to enclose the nozzle 22, and shaped to travel over the growing plants, so as to retain the chemical-laden vapor discharged by the nozzle in close proximity to the plants, thereby insuring effective operation. It is preferred to provide the ends of the hood with fabric curtains 36, to prevent escape of the fumes.

The pipe 24 is provided with an outlet discharging into a pipe 37, leading to the steam pipe 21.

It is well known that the health of growing plants depends principally upon their ability to absorb nourishment and to convert the latter into the life-sustaining vegetable acids. The strength of the acid in any one species varies in different parts of the plant such as the stem, leaves, blossoms, seeds, etc. The acids developed by plants of one species may also differ in characteristics from the acids of another species. If the plants are deprived of the means for producing these health sustaining acids, or if such acids are neutralized or destroyed, they will die. One of the great dangers of fumigating growing vegetation is that the materials used, while destroying insects or the like, will also neutralize or destroy the vegetable acids, and thus seriously injure the plants. This danger is avoided by the present method.

Hydro-carbon oils are known to contain carbon, hydrogen and oxgen, all of which are plant foods and assist the plants in generating the vegetable acids necessary to life. They are also fatal to insect bacterial and fungi life. The real problem is to apply the hydro-carbon to the plants in a manner to aid them and not to destroy them.

If such oils are applied in the form of a liquid or heavy spray, the pores of the plants are closed and choked to such an extent that circulation is retarded or entirely cut off, resulting in irreparable injury. If, however, the hydro-carbon is vaporized by heat so that it is in a more or less gaseous form the life-giving ingredients are readily assimilated by the plants, and no injury results.

In the practice of the present invention the safe administration of hydro-carbon is accomplished by filling the tank 26 with a hydro-carbon oil and causing it to drip into the receptacle 25, where it is transformed by heat without combustion in the presence of atmospheric air, into an oily smudge which will adhere to the plants. Any desired hydro-carbon may be used, such for instance, as crude oil. There is no danger of overfeeding, for the reason that the plants themselves automatically refuse to take more than is actually needed, and the surplus will remain on the leaves, stems, etc., without choking the pores, until it is eventually absorbed. Neither is there any danger of damaging the plants if the smudge is applied in a sufficiently moist condition to prevent it from absorbing moisture from the plants. If the smudge itself is not inherently moist enough, the additional or necessary moisture is supplied by combining the smudge with the steam. If the particular plants being treated require anything in addition to the hydro-carbon smudge, to stimulate the generation of vegetable acid, the additional ingredient may be added through the medium of receptacles 13 or 34, in the form of a volatile acid oil extracted from any plants which naturally contain said acid oil in available form. Many plants contain an excess of volatile acid oils which if fed to other growing plants of a different species, will have a tonic or stimulating effect on the latter. For instance, the juices of the well-known bitter weed or any other plant containing the desired constituents, may be extracted in any desired manner and applied to growing plants by placing the extract in either of the receptacles 33 or 34, so as to be taken up by the steam and in that manner combined with the smudge produced by the cup 25, the combined fumes being discharged in the vicinity of the plants to be treated.

In operation, the tank 10 is filled to the proper level with water, which flows down through the coil 16, and up into the pipe 17, to the same level as that of the water within the tank. The burner 13 is lighted causing the water in the coil 16 to be heated to a sufficiently high temperature to generate a soft wet steam of from 120° to 130° C. The water vapor developed in the pipe 17 is carried over into the pipe 18, and is further heated in the coil 20 to produce sufficient pressure to cause it to be discharged at the nozzle 22. At the same time the container 25 is being heated by the burner 13 and the smudge-producing chemical from container 26, as it is being fed, coming into contact with the heated surface of the vaporizing chamber, produces fumes which are carried off through the pipe 28. Other chemicals may be added as desired at the points 33 and 34.

If it should be desired to fumigate without the use of steam, the valve T in container 34 is opened, to permit the steam to escape, thereby acting in the nature of a bypass. The hot air passing through pipe 37, as it flows to the delivery portion of the pipe 21, develops sufficient pressure to draw the smudge-like fumes through that portion of the pipe 21 back of the connection of the hose 37ª, with said pipe. When it is desired to spray trees, a suitable hose is connected to coupling 22, and compressed air forced into pipe 29.

In practice the apparatus is caused to travel between the rows of vegetation, the plants being covered by the hood so as to bring the chemical-laden fumes into direct contact with them. The chemical hydro-carbon delivered from the container 26 will be inhaled by the insect through the body pores, resulting in almost instant death. The fatal action is hastened by delivering the smudge at a temperature higher than that of the surrounding atmosphere. The higher temperature is obtained either by combining the smudge with steam or with the hot air passing through the pipe 37, or both.

The chemical smoke builds up a very light smudge which will adhere to plants. This adhering substance being of an oily nature, is impervious to water but on rainy days or at night during a heavy dew, it will emit a noxious odor which is destructive to insect life. By discharging the fumes below the leaves of the plants, the leaves will absorb the chemical through their pores, thus acquiring a plant food and building up a capability of resisting the ravages of insect life. If it should become necessary to attack borers and other insects below the surface of the ground, around the roots of plants, a suitable tool capable of being thrust into the ground, is connected with the steam pipe at coupling 22, and the fumes discharged into the ground at the desired points.

The advantages of the invention are apparent. By the method described it is possible to instantly eradicate insects, bugs, weevils, caterpillars, worms, fungus and other destructive agents and at the same time supply the plants with life-sustaining nourishment. An important advantage is that the plants may be fumigated with equal convenience in wet, dry, windy or quiet, or any other kind of weather, and they are provided with a substance which acts as a protection against future onslaughts of the destructive agents of nature.

This application is a division of application, Serial Number 675,775, filed November 19, 1923, which eventuated into a patent dated Oct. 28, 1924, No. 1,513,138. It is to be understood that the apparatus described has been selected for illustrative purposes only, and that the invention is not limited thereto.

Having thus explained the nature of the invention and described an operative manner of practicing the same, although without attempting to set forth all of the forms of apparatus for practicing the invention, or all of the forms of its use, what is claimed is:—

1. The method of treating plants comprising producing a hydro-carbon smudge which will adhere to the plants, mixing a plant food with said smudge and discharging the mixture in the vicinity of growing plants.

2. The method of treating plants comprising producing a hydro-carbon smudge which will adhere to the plants, combining the fumes of a volatile vegetable oil with said smudge, and applying the same to growing plants.

3. The method of treating plants comprising producing a smudge by subjecting unconfined hydrocarbon oil to heat without combustion, while exposed to normal atmospheric air, combining fumes of a volatile oil with said smudge and applying the same to the plants.

4. The method of treating plants comprising separately producing a wet gaseous vapor and a hydrocarbon smudge, mixing said vapor and fumes, incorporating a plant food into the mixture, and discharging the same in the vicinity of growing plants.

5. The method of treating plants comprising producing a hydro-carbon smudge which will adhere to the plants, combining with the smudge a plant food and discharging the mixture in the vicinity of growing plants, while the latter are maintained within a substantially closed space.

In testimony whereof I have hereunto set my hand.

SIGMUND TARNOK.